July 18, 1967  F. J. ROONEY  3,331,557
DOCKING AID
Filed Aug. 25, 1965
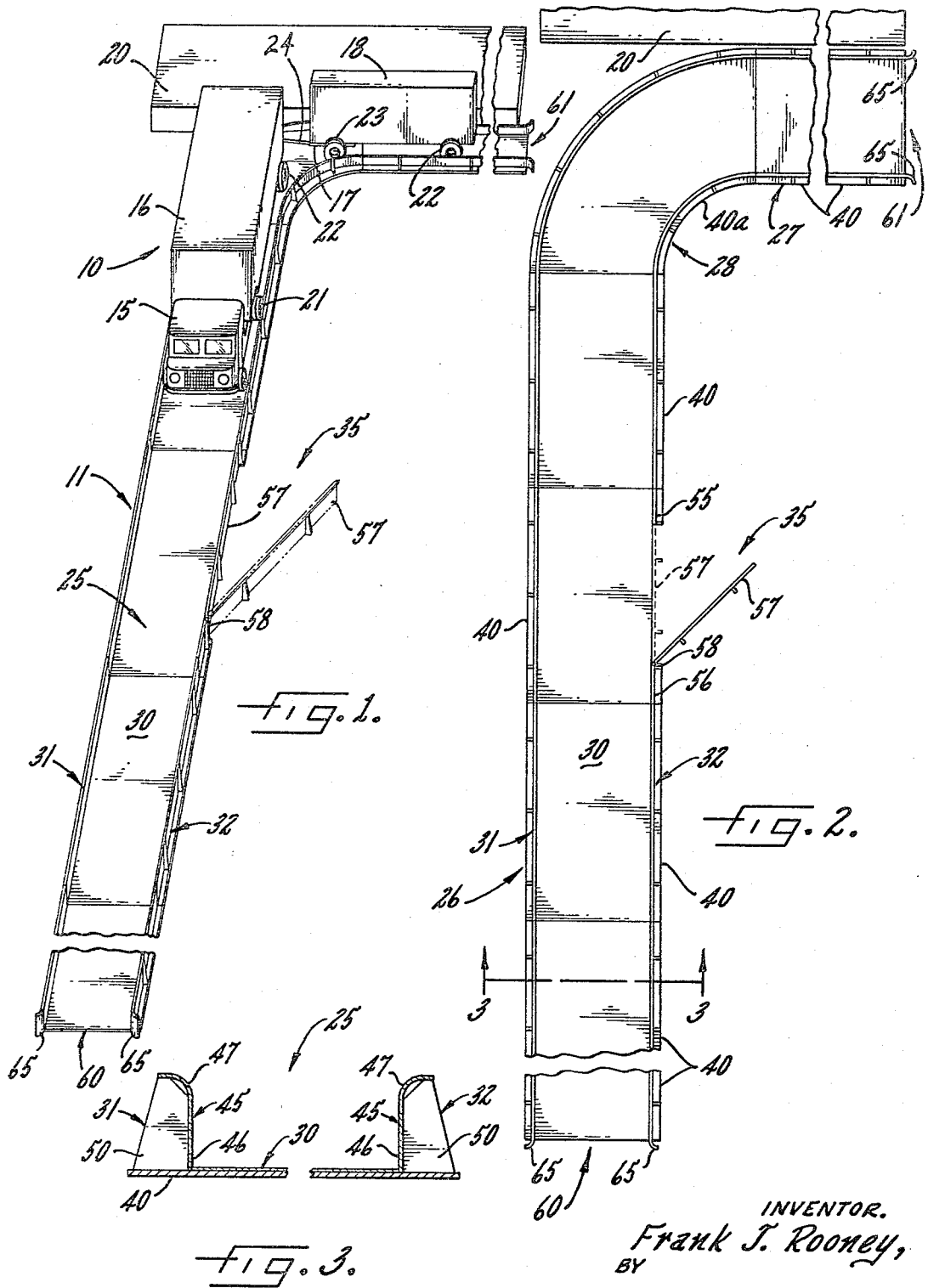
INVENTOR.
Frank J. Rooney,
BY
Hume, Groen, Clement & Hume
ATTORNEYS.

3,331,557
DOCKING AID
Frank J. Rooney, Chicago, Ill., assignor to
Matthew F. Rooney, Jr., Chicago, Ill.
Filed Aug. 25, 1965, Ser. No. 482,553
8 Claims. (Cl. 238—3)

This invention relates in general to the trucking industry. It deals more particularly with the handling of articulated trucks comprising three or more vehicle sections.

Large trucking rigs or "semis" have traditionally been made up of a tractor and a trailer pivotally connected together about a "fifth" wheel on the tractor. An experienced driver is able to skillfully maneuver one of these rigs while traveling in reverse, as well as in a forward gear, to bring the rig into a precisely selected location against a loading dock. Consequently, the trailer can be unloaded, loaded, and the weight on each axle adjusted after loading, all through the conventional rear doors of the trailer, without difficulty in positioning the trailer for such an operation. The advent of the three (or more) section rig has changed all this, however.

A three-section rig, for example, comprises a tractor, a first trailer section pivotally connected to the tractor about its fifth wheel, a two wheel dolly assembly mounting another fifth wheel and pivotally connected to the rear of the first trailer section, and a second trailer section pivotally connected to the dolly assembly about its fifth wheel. A rig of this type carries considerably more freight than a conventional single trailer rig while requiring no additional tractor power. The economic advantages of the use of multiple trailer rigs are obvious.

Unfortunately, along with the great cost saving advantages made possible by the use of multiple trailer sections come problems which detract from these seemingly obvious advantages and, accordingly, savings. For example, one serious problem faced in the handling of this type of rig is that of putting the individual trailer sections up against a dock to adjust their axle loads once a rig has been put together. It is highly desirable to keep the sections together because of the time loss and labor consumed in separating them and then reconnecting them after the load has been adjusted. However, trying to maneuver one of these rigs free hand against a dock has proved to be an impractical, if not impossible, task.

Assembly of a multiple trailer section rig also presents a problem. Backing a rig comprising a tractor and a single trailer section, for example, into precise position for attaching the dolly of a third trailer section is also a laborious and time consuming operation. Before alignment is ordinarily achieved considerable time as squandered and costs increased.

Accordingly, it is an object of the present invention to provide a new and improved method of handling multiple trailer section truck rigs to permit loading, unloading, and weight adjustment of the trailer sections without separating the rig.

It is another object to provide a method of handling multiple trailer section truck rigs to permit loading, unloading, and weight adjustment of the trailer sections in greatly reduced time and with minimal labor cost.

It is still another object to provide a method of the aforedescribed character which facilitates gaining access to the trailer sections through their conventional rear doors from a standard loading dock without separating the rig.

It is yet another object to provide a method of aligning sections of a multiple trailer section truck rigs to facilitate connecting them without laborious "jockeying" of the rig by the driver.

It is a further object to provide a new and improved docking aid arrangement for facilitating load handling in the trailer sections in a multiple trailer section rig without separating the rig.

It is still a further object to provide a docking aid arrangement which facilitates connecting the individual sections of a multiple trailer section truck rig without the "jockeying" heretofore required to align the sections.

The foregoing and other objects are realized in accordance with the present invention by providing a docking trough having a first segment extending generally perpendicular to and toward a loading dock, a second segment extending generally parallel to the dock on one side of the first segment, and a third segment defining an arc and interconnecting the first and second trough segments. The docking trough comprises a base having side walls upstanding therefrom and spaced a predetermined distance apart corresponding to the outside width of the tires on the trailer sections. The first trough segment has an exit mouth for a rig spaced a substantial distance from the dock. The trough further includes an entrance mouth in one of these sections spaced toward the dock from the aforementioned exit mouth.

In order to gain access to an intermediate trailer section, for example, to adjust the axle weight or otherwise manipulate the load, a complete three-section rig or the like is driven into the entrance mouth and through the trough until all of its wheels lie between the trough walls. The entrance mouth is then closed and the rig is backed up with the side walls of the trough preventing the sections from becoming misaligned by guiding the wheels immediately adjacent them. When the rear trailer section reaches the curved trough segment, the outside curved wall forces the wheels of the rear trailer section to follow its contour in an arc until the section is parallel to the loading dock. At this point the rear door of the intermediate section faces the dock and can be opened for access. As an intermediate step, the rear trailer section door is accessible to the dock when it initially reaches the curve segment of the trough and access can be gained to the rear trailer section at this time.

The radius of the arc of curvature of the curved trough segment is dependent upon the length of the trailer sections. A relatively long trailer section requires a relatively greater radius arc than a relatively shorter trailer section.

It is also possible to use the docking aid arrangement embodying features of the present invention to join individual sections of the rig together, as well as to facilitate gaining access to the trailer sections, for example. In this light, individual trailer sections are drawn into the trough through the entrance mouth by a tractor, and backed up in the trough once the entrance mouth has been closed. As many trailer sections as desired can be positioned in the trough in this manner whereby their connector equipment including fifth wheels, for example, are precisely aligned.

The invention, together with its organization and method of operation, taken with other objects and advantages thereof, is illustrated more or less diagrammatically in the accompanying drawings, in which:

FIGURE 1 is a perspective view of a truck docking aid arrangement embodying features of the present invention being utilized by a multiple trailer section truck rig to gain access to the conventional rear door of the forward trailer section;

FIGURE 2 is a plan view of the docking arrangement illustrated in FIGURE 1; and

FIGURE 3 is a sectional view taken along line 3—3 of FIGURE 2.

Referring now to the drawings, and particularly to FIGURE 1, a multiple trailer section truck rig 10 is illustrated diagrammatically in a truck docking arrangement 11 embodying features of the present invention. The rig 10, which comprises a tractor 15, a front trailer section 16, a dolly assembly 17, and a rear trailer section 18, has been backed according to the method of the present invention into a position where the conventional rear doors (not shown) of the front trailer section 16 are readily accessible to the conventional loading dock 20.

The illustrated standard tractor 15 has a width of approximately 94 inches across its beam between the outside edges of its widest spaced tires 21. The trailer sections 16 and 18 are standard 24 feet long sections having a width of approximately 94 inches across their beams between the outside edges of their widest spaced tires 22. The dolly 17 is also 94 inches wide across its beam between outside edges of its tires 23, and includes a boom 24 approximately six feet long extending forwardly to connection with the trailer section 16.

The rig 10 briefly described above is merely exemplary of the type of multiple trailer section truck rig presently in use, of course. The rig 10 might vary in the number of trailer sections pulled by the tractor 15. Two trailer sections 16 and 18 are described here but there might be three or more of such sections. In addition, the length of each of the trailer sections 16 and 18 is 24 feet in the present illustration, but they might be somewhat larger or even shorter. Trailer sections 40 feet in length are common. In addition, the tire width of the tractor and trailer sections, as well as the dolly, might be greater than 94 inches or, on certain rigs, less than 94 inches. The truck docking aid arrangement 11 is modified to accommodate these various differences in rig configuration and size without departing from the invention.

Referring now to all of the figures, the docking aid arrangement 11 comprises a trough 25 which is generally L-shaped in plan view. The trough 25 has an elongated generally straight segment 26 extending perpendicularly toward the dock 20, an elongated generally straight segment 27 extending parallel to the dock 20 on one side of the segment 26, and an arcuate segment 28 joining the segments 26 and 27.

The trough 25 is fabricated of steel plate and includes a base assembly 30 and a pair of upstanding wall assemblies 31 and 32 mounted on the base assembly. The wall assemblies 31 and 32, which will hereinafter be described in detail, are substantially identical except for an entrance gate 35 formed in the inner wall assembly 32.

The base assembly 30 comprises a series of steel base plates 40 approximately ½ inch thick and 107 inches wide. In the present illustration, where docking of 24 feet trailer sections is contemplated, the straight segment 26 of the trough 25 is made up of eight such base plates 40 each fifteen feet long (several broken away). In turn, the straight segment 27 of the trough 25 is made up of two base plates 40 each fifteen feet long. The arcuate segment 28 connecting the segments 26 and 27 of the trough 25 includes a single quarter round base plate 40a of sufficient length to complete a 90° bend in the trough 25.

The outer wall assembly 31 includes an upstanding wall plate 45 welded to each base plate 40 adjacent one side of the base plate. Each wall plate 45 includes a vertical lower section 46 nine inches high and an outwardly curved upper section 47 extending upwardly of the lower section another two inches. Accordingly, each wall plate 45 is eleven inches in overall height, making the entire wall assembly eleven inches high.

Each of the wall plates 45 is braced inwardly by a series of buttresses 50 welded to the wall plate and to a corresponding base plate 40. These buttresses 50 might be spaced at five feet intervals along the fifteen feet lengths of the base plates 40 and corresponding wall plates 45. They provide the wall assembly 31 with the necessary rigidity to withstand the heavy side loads exerted by the rig 10.

The inner wall assembly 32 is, with but one exception, identical in construction to the outer wall assembly 31, as has previously been pointed out. Accordingly, its components are identified by corresponding reference numerals and a further detailed description of the inner wall assembly, except for this one exception, is not thought to be necessary.

The exception previously referred to is the entrance gate 35 formed in the inner wall assembly 32. In the present illustration the wall plate 45 (of the inner wall assembly 32) mounted on a base plate 40 in the trough segment 26 spaced one such base plate 40 from the curved trough segment 28 is made in three separate parts. Two oppositely spaced end parts 55 and 56 are fixedly mounted on the base plate 40 while a central "gate" part 57 is pivotally connected at 58 to the end parts 56 furthest from the dock 20. Each wall part 55–58 has buttresses 50 welded thereto, but the buttresses associated with the "gate" part 57 are not welded to the base plate 40.

With the gate part 57 of the gate 35 pivoted closed, as illustrated in dotted lines in FIGURE 2, the lower vertical sections 46 of the opposed wall plates 45 in each wall assembly along their entire lengths are spaced approximately ninety-five inches apart. It will thus be seen that a clearance of approximately one-half inch will remain between the outer edges of the tires 21–23 on the rig 10 and corresponding wall assemblies 31 and 32 when the rig is in the docking aid arrangement 11. It will be recognized, of course, that maintenance of such a clearance in structure of this size is difficult and it might vary along the length of the trough 25. There must, however, be some clearance.

The gate 35 is held in its closed position by any suitable locking means (not shown) which is releasable to permit opening the gate. In adjacent base plates 40 and wall plates 45 are held together by suitable locking means to prevent their separation during use of the docking aid arrangement 11 while permitting easy separation in disassembling the docking aid arrangement.

To enter the docking aid arrangement 11 the gate 35 is opened by releasing a suitable locking means (not shown) and swinging the gate part 57 outwardly to its solid line position in FIGURE 2. The rig 10 is then driven in the gate 35 in a direction away from the dock 20. When the rig 10 is entirely into the docking arrangement 11 the gate 35 is closed and locked.

The rig 10 is then backed up straight in the trough 25. The wall assemblies 31 and 32 acting on the tires 21–23 keep the rig sections 15, 16 and 18 in precise alignment until the rear section reaches the curve adjacent the dock 20. The rear rig section 18 can then be entered from its conventional rear doors if load adjustment, for example, is necessary.

To obtain access for load adjustment in the front trailer section 16 of the rig 10, it is merely backed up further. The rear rig section 18 is forced around the 90° turn by the curved outer wall assembly 31 in the arcuate trough segment 28 acting on the outside tires 22 of this rig section. Soon the rig section 18 has reached the position seen in FIGURE 1 and the front rig section 16 is backed up sufficiently close to the dock 20 to gain access to the rig section 18 from the dock.

After all load adjustments have been made, the rig 10 is driven out of the open end 60 of trough segment 26. In this light, note that the open end 60 of the segment 26 and open end 61 of the trough segment 26 have outwardly curved flanges 65 formed on the ends of the wall assemblies 31 and 32. These flanges 65 serve to prevent tire damage to the rig 10 if it is inadvertently driven into the wall assembly ends.

The docking aid arrangement 11 has, to this point, been described in detail only in terms of its use as a means for gaining access to the trailer sections 16 and 18 from the dock 20. As will readily be recognized, however, it finds advantageous application as a means for properly aligning various rig sections to interconnect them. In this light, the tractor 15 is used to pull individual trailer sections into the trough 25 and back them past the gate 35 where they are easily interconnected in their aligned relationship.

The great advantage of the truck docking air arrangement 11 and method should now be readily recognized. All of the time and expense of trying to jockey three and four section truck rigs backward is eliminated.

While the embodiment described herein is at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A docking arrangement for assisting in the positioning of trailer sections in a multiple trailer section trucking rig so that access can readily be gained to the rear of any selected section from a dock, comprising: a docking trough including base means and oppositely disposed outer side walls upstanding therefrom, said side walls being spaced a distance apart at least as great but not more than slightly greater than the outside width of the tires in the trailer sections, said trough comprising a first generally linear segment extending away from the dock, a second generally linear segment extending parallel to the dock on one side of the first linear segment, and a third arcuate segment joining said first and second linear segments, the tires of the trailer section being closely guided by said outer side walls and free from interference by anything on the inside of the tires as the rig is moved in said trough so that a section is caused to turn into perpendicular relationship to an adjacent section and expose the rear of the forwardmost of said two sections for access, and an entrance gate formed in said first generally linear segment, said entrance gate being formed in one of the upstanding outer side walls of said first linear segment to afford access to said docking trough means by said trucking rig from the side of said trough.

2. The docking arrangement of claim 1 further characterized in that said first and second segments extend at right angles to each other, and said third arcuate segment defines a quarter circle in joining said linear segments.

3. A docking arrangement for assisting in the positioning of trailer sections in a multiple trailer section trucking rig so that access can readily be gained to any selected section from a dock, comprising: a docking trough including base means and a pair of outer side walls upstanding therefrom, said side walls being spaced a distance apart at least as great but not more than slightly greater than the outside width of the tires on the trailer sections, each of said side walls including a lower section extending straight up from said base means and an upper section curved outwardly toward generally parallel relationship with said base means, said trough comprising a first generally linear segment extending generally perpendicularly away from the dock, a second generally linear segment extending generally parallel to the dock on one side of the first linear segment, and a third arcuate segment joining said first and second linear segments, the tires of the trailer section being closely guided by said outer side walls and free from interference by anything on the inside of the tires as the rig is moved in said trough so that a section is caused to turn into perpendicular relationship to an adjacent section and expose the rear of the forwardmost of said two sections for access, and an entrance gate formed in said first generally linear segment, said entrance gate being formed in one of the upstanding outer side walls of said first linear segment to afford access to said docking trough means by said trucking rig from the side of said trough.

4. The docking arrangement of claim 3 further characterized in that said entrance gate comprises a section of said one side wall which is pivotally connected at one end to the rest of said side wall and swings outwardly from said side wall to leave an entrance mouth facing said second linear segment.

5. An arrangement for assisting in the positioning of trailer sections in a multiple trailer section trucking rig including a tractor so that the sections and tractor can easily be joined together, comprising: a trough including base means and outer side walls upstanding from said base means, said side walls being spaced a distance apart at least as great but not more than slightly greater than the outside width of the tires in the trailer sections, and entrance means to said trough, said entrance means comprising an entrance gate formed in one of the upstanding outer side walls of said trough, whereby with a trailer section in said trough, said rig tractor and/or a section can be driven into said entrance means and then backed through the trough into position adjacent said trailer section already in said trough for joining to said last mentioned section.

6. The arrangement of claim 5 further characterized in that each of said side walls includes a lower section extending straight up from said base means and an upper section curved outwardly toward generally parallel relationship with said base means.

7. A docking arrangement for assisting in the positioning of trailer sections in a multiple trailer trucking rig so that access can readily be gained to the rear of any trailer section from a dock comprising: docking guide means including base means and side walls extending upwardly therefrom, said side walls being spaced apart a distance substantially equal to one of the outside width of the tires in the trailer sections and the inside width of said tires, said guide means comprising a first linear segment extending away from the dock, a second linear segment extending parallel to the dock on one side of the first linear segment, and a third arcuate segment joining said first and second linear segments, the tires of the trailer sections being closely guided by said side walls as the rig is moved in said trough so that a section is caused to turn into perpendicular relationship to an adjacent section and expose the rear of the forwardmost of the two sections for access, said first generally linear section having an entrance gate formed therein, said entrance gate being formed in at least one of the upstanding side walls of said first linear segment to permit access to said guide means by said rig from the side of said guide means.

8. An arrangement for assisting in the positioning of trailer sections in a multiple trailer section rig including a tractor, so that the sections and tractor can easily be joined together, comprising: guide means including base means and at least two side walls upstanding therefrom, said side walls being spaced apart a distance substantially the same as one of the outside width of the tires in the trailer sections and the inside width of said tires, and an entrance gate formed in at least one of said side walls so that a trailer section can enter said guide means through the entrance gate from the side of the guide means, whereby with a trailer section in said trough, said rig tractor and/or a section can be driven into said guide means through said side entrance gate and then backed through the guide means into position adjacent said trailer section already in said guide means for joinder thereto.

References Cited

UNITED STATES PATENTS

| | | | |
|---|---|---|---|
| 1,668,546 | 5/1928 | Bramley | 238—4 |
| 2,862,333 | 12/1958 | Gardiol | 238—10 |

ARTHUR L. LA POINT, *Primary Examiner.*

R. A. BERTSCH, *Assistant Examiner.*